United States Patent [19]

Matsumoto et al.

[11] 4,097,128
[45] Jun. 27, 1978

[54] LIQUID CRYSTAL COLOR DISPLAY DEVICES

[75] Inventors: Shoichi Matsumoto, Yokohama; Masahiro Kawamoto, Kamakura; Kiyoshi Mizunoya, Yokohama, all of Japan

[73] Assignee: Tokyo Shibaura Electric Co., Ltd., Kawasaki, Japan

[21] Appl. No.: 678,553

[22] Filed: Apr. 20, 1976

[30] Foreign Application Priority Data

| Apr. 24, 1975 | Japan | 50-49155 |
| Oct. 9, 1975 | Japan | 50-121269 |
| Oct. 9, 1975 | Japan | 50-121270 |
| Oct. 9, 1975 | Japan | 50-121271 |
| Oct. 9, 1975 | Japan | 50-121272 |

[51] Int. Cl.² .............................. G02F 1/13
[52] U.S. Cl. ............................ 350/335; 350/347
[58] Field of Search ............. 350/160 LC, 150; 340/324 R, 324 M, 336

[56] References Cited

U.S. PATENT DOCUMENTS

| 3,854,793 | 12/1974 | Kahn | 350/160 LC |
| 3,914,020 | 10/1975 | Helfrich | 350/160 LC |
| 3,915,553 | 10/1975 | Adams et al. | 350/160 LC |
| 3,915,554 | 10/1975 | Maezawa | 350/160 LC |
| 3,967,881 | 7/1976 | Moriyama et al. | 350/160 LC |

OTHER PUBLICATIONS

Kahn: "Electric-Field Induced Orientational Deformation of Nematic Liquid Crystals: Tunable Birefringence," *Applied Physics Letters,* vol. 20, pp. 199–201, Mar. 1, 1972.

Raynes: "Improved Contrast Uniformity in Twisted Nematic Liquid-Crystal Electro-Optic Display Devices," *Electronics Letters,* pp. 141–142, vol. 10, May 2, 1974.

*Primary Examiner*—Edward S. Bauer
*Attorney, Agent, or Firm*—Oblon, Fisher, Spivak, McClelland & Maier

[57] ABSTRACT

A liquid crystal color display device which comprises a first electrode; a first substrate whose surface has a property of orientating the molecules of a nematic liquid crystal parallel with said surface; a second electrode; a second substrate whose surface has a property of orientating the molecules of the nematic liquid crystal perpendicular to said surface; a nematic liquid crystal interposed between the first and second substrates; at least one polarizer; and a means whereby the birefringence of the liquid crystal cell is changed to display various colors.

16 Claims, 8 Drawing Figures

LIQUID CRYSTAL COLOR DISPLAY DEVICES

BACKGROUND OF THE INVENTION

This invention relates to liquid crystal color display devices. Hitherto, a system of electrically controlled birefringence (abbreviated as "ECB") has been proposed as color display means using a nematic liquid crystal. This system is also referred to as a system of deformation of vertical aligned phases (abbreviated as "DAP"). With this ECB sytstem, where the dielectric anisotropy of a liquid crystal used is positive, a liquid crystal cell is formed by interposing a liquid crystal between two substrates so treated as to cause the long axis of the molecules of the liquid crystal to be orientated parallel with the substrate surface, and where the dielectric anisotropy of a liquid crystal used is negative, a liquid crystal cell is formed by interposing a liquid crystal between two substrates so treated as to cause the long axis of the molecules of the liquid crystal to be orientated perpendicular to the substrate surface. The liquid crystal cell thus formed is impressed with a higher voltage than prescribed through a pair of electrodes to vary the mode of orientation of the molecules of the liquid crystal with a resultant change in the birefringence of a liquid crystal layer, thereby displaying colors by means of a polarizing plate.

The above-mentioned ECB (or DAP) system has the drawback that it is necessary to apply a high level of voltage (generally referred to as "threshold voltage") in order to attain the inclined orientation of the molecules of a liquid crystal relative to the substrate surface, when the long axis of said molecules initially lies parallel with or perpendicular to the substrate surface, thus requiring application of high voltage for operation of a liquid cell obtained. Further disadvantage of the ECB (or DAP) system is that various colors such as red, blue and green can only be displayed within an extremely small range of voltage, namely, a range of only about one volt starting with the threshold voltage, presenting difficulties in selecting a desired color. In other words, the ECB system demands the stability of a power source and the high precision of voltage control due to the difficulty of selecting colors by voltage, failing to be practically applied as a liquid crystal color display device.

SUMMARY OF THE INVENTION

It is accordingly an object of this invention to provide a liquid crystal color display device capable of successively displaying various colors at low voltage under stable condition, allowing broad range of voltage for display of respective colors, namely, effecting distinct color separation, and easily controlling the selection of colors.

Another object of the invention is to provide a liquid crystal color display device capable of indicating a distinct black color and controlling the selection of colors having good brightness.

Still another object of the invention is to provide a liquid crystal color display device capable of indicating pure ditinct colors.

One characteristic of this invention is that the subject liquid crystal color display device comprises a liquid crystal cell formed by interposing a nematic liquid crystal between first and second substrates, at least one of said substrates transparent and each of said substrates being provided with first and second electrodes, at least one of which is transparent, at least one polarizer disposed in the optical path of the liquid crystal cell, and means for successively displaying various colors by changing the birefringence of the nematic liquid crystal; and that the first substrate has a surface designed to orientate the molecules of the nematic liquid crystal parallel with said surface, and the second substrate has a surface designed to orientate the molecules of the nematic liquid crystal perpendicular to said surface. A liquid crystal cell having the above-mentioned characteristic is hereinafter referred to as a "perpendicular-parallel orinetated liquid crystal cell".

Another characteristic of the invention is that the subject liquid crystal color display device comprises an additional liquid crystal cell in which a liquid crystal having a positive dielectric anisotropy is interposed between two substrates each provided with an electrode and which includes means for causing the liquid crystal to present rotatory polarization when not impressed with an electric field and cease to display said rotatory polarization when impressed with an electric field; said additional liquid crystal cell is disposed to face the above-mentioned "perpendicular-parallel orientated liquid crystal cell" in the same optical path as the latter cell; and at least one polarizer is provided in the optical path of said additional liquid crystal cell.

Another characteristic of the invention is that the subject liquid crystal color display device has a plurality of "perpendicular-parallel orientated liquid crystal cells" disposed in the same optical path; at least one polarizer is provided in the optical path of each liquid crystal cell; and means for changing the birefringence of the nematic liquid crystal is received in at least one of the liquid crystal cells.

Still another characteristic of the invention is that the subject liquid crystal color display device comprises a nematic liquid crystal having a positive dielectric anisotropy and means for causing the "perpendicular-parallel orientated liquid crystal cell" to present a retardation value of 300 to 10,000 m$\mu$ when not impressed with an electrid field.

A further characteristic of the invention is that the subject liquid crystal color display device comprises a nematic liquid crystal having a negative dielectric anisotropy and means for causing the "perpendicular-parallel orientated liquid crystal cell" to show a retardation value of 100 to 2,000 m$\mu$ when not impressed with an electric field.

Further objects of the invention will be obvious from the following description and claims.

DETAILED DESCRIPTION OF THE INVENTION

This invention relates to a liquid crystal color display device which comprises a liquid crystal cell, in which the inner wall of one of two substrates having an intervening nematic liquid crystal is so treated as to cause the molecules of the nematic liquid crystal to be orientated parallel with the inner wall of said one substrate, and the inner wall of the other substrate is so treated as to cause the molecules of the nematic liquid crystal to be orientated perpendicular to the inner wall of said other substrate; and at least one polarizer, wherein the birefringence of the nematic liquid cell is made to change with an electric field or magnetic field applied to the liquid crystal cell, thereby displaying red, green and blue colors and intermediate colors.

There will now be further detailed by way of illustration the arrangement and operation of the liquid crystal color display device of this invention. One of two substrates constituting the liquid crystal cell is transparent and has its inner wall so treated as to cause the long axis of the molecules of the nematic liquid crystal to be orientated perpendicular to said inner wall. The other substrate is transparent and has its inner wall so treated as to cause the moleucles of the nematic liquid crystal to be orientated parallel with said inner wall. The liquid crystal cell comprises two substrates which are each provided with a transparent electrode, whose treated surfaces are made to face each other, and between which a nematic liquid crystal is sandwiched. One or both sides of the liquid crystal cell is fitted with a polarizer. The liquid crystal color display device of this invention further includes means for displaying different colors through change of voltage (effective voltage) levels impressed on a liquid crystal layer over the voltage range in which the birefringence of the liquid crystal varies with voltage levels impressed on the liquid crystal layer.

There will now be described by reference to the appended drawings a liquid crystal color display device embodying this invention.

Figure 1:
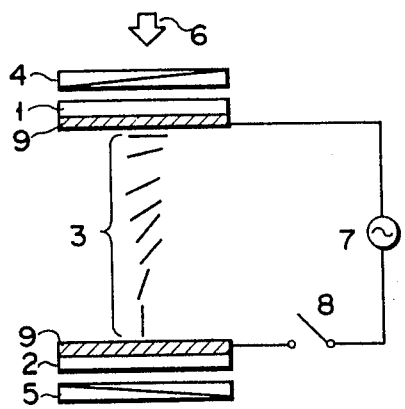
FIG. 1 is a cross sectional view of a liquid crystal color display device according to one embodiment of this invention.

FIG. 1 is a schematic cross sectional view of a liquid crystal color display device according to one embodiment of this invention. Two transparent glass substrates 1, 2 are each provided with a transparent electrode 9 covering the whole or part of the substrate surface. That surface of one substrate 1 which is provided with the transparent electrode 9 is so treated as to cause the long axis of the molecules of a liquid crystal 3 to be orientated parallel with said surface. That surface of the other substrate 2 which is provided with the transparent electrode 9 is so treated as to cause the long axis of the molecules of the liquid crystal 3 to be orientated perpendicular to said surface. The two substrates 1, 2 are so disposed as to cause the treated surfaces thereof to face each other, and have a liquid crystal 3 interposed therebetween. As seen from FIG. 1, the molecules of the liquid crystal 3 are orientated in successively changing relationship with both substrates 1, 2, that is, from a parallel position with the substrate 1 to a perpendicular position to the substrate 2. Polarizers 4, 5 are disposed in the optical path, namely, on both sides of a liquid crystal cell formed of the substrates 1, 2 and liquid crystal 3.

A light 6 coming into the liquid crystal cell 3 passes through the polarizer 4 to be changed into a linearly porarized light and then runs through the liquid crystal cell 3 to be converted into an elliptically polarized light by the birefringence of the liquid crystal layer 3. That portion of the elliptically polarized light which is aligned with the polarization axis of the polarizer 5 is allowed to travel through said polarizer 5. Where an incident light 6 is white, the portion of a light carried through the polarizer 5 presents a color due to a phenomenon of interference. This color varies with the birefringence of the liquid crystal 3 and thickness of a layer of said liquid crystal 3. Where, therefore, liquid crystal layers having different birefringence and thicknesses are interchangeably used while voltage is not applied, then it is possible to display any desired color such as a red, blue or green color or any intermediate color.

Particularly where, the polarization axes of the polarizers 4, 5 are made to intersect each other at right angles, and further one polarization axis is made to define angle of 45° with the direction in which the surface of the substrate 1 is so treated or rubbed as to cause the molecules of the liquid crystal 3 to be orientated parallel with said surface (this treated surface is hereinafter referred to as a "parallel treated plane"), then a light transmitted through the liquid crystal cell presents a maximum intensity, and a color obtained shows a maximum brightness. Where the polarization axes of the polarizers 4, 5 are arranged parallel with each other, and further are made to define 45° with the direction in which the surface of the substrate 1 is subjected to the "parallel treatment", then a color complementary with the above-mentioned color is indicated with a maximum degree of intensity and brightness. Where the polarization axis of one polarizer is made to define any other angle than 45° with the direction in which the surface of the substrate 1 is subjected to the "parallel treatment", then a chnge occurs in the intensity of a light transmitted through the liquid crystal cell. Further, where the polarization axes of the polarizers 4, 5 bear other relations with each other than perpendicular intersection or parallel arrangement, then different colors appear from those which are obtained in the case of the aforesaid perpendicular intersection or parallel arrangement. Thus, variation of the relative positions of the polarization axes of the polarizers 4, 5 leads to changes in the intensity of a light passing through the liquid crystal cell as well as in the colors obtained.

A lead drawn out of the first substrate 1 is connected to a switch 8 through a power source 7, and a lead extending from the section substrate 2 is directly connected to the switch 8. Where the switch 8 is closed to impress an increasing amount of voltage on the liquid crystal 3, starting with the condition in which the liquid crystal 3 is not supplied with any voltage, then changes successively occur in the inclination angles which the respective molecules of the liquid crystal 3 define with the surface of the two substrates 1, 2, giving rise to variation in the birefringence of the liquid crystal layer. Where a monochromatic light is brought into the liquid crystal layer, then changes appear in the intensity of said light while it passes through the liquid crystal layer. Where a white light comes into the liquid crystal layer, then changes take place in the color of a light traveling through said layer due to variation of the birefringence of the liquid crystal layer caused by increased impression of voltage. With respect to a voltage range where any large supply of voltage does not give rise to variation of the birefringence of the liquid crystal 3, namely, a voltage range where said birefringence is saturated, a light passing through the liquid crystal layer presents a blac or white color, either ceasing to display any color or being turned into a very faint light. The voltage range where the birefringence of the liquid crystal is saturated varies with the dielectric anisotropy or birefringence of the liquid crystal 3 or the thickness of the liquid crystal layer. Said voltage range generally lies between 8 to 10 volts.

With the liquid crystal color display device of this invention, the "parallel treatment" of the surface of the substrates included in the liquid crystal cell (namely, treatment for causing the molecules of the liquid crystal to be orientated parallel with the substrate surface) can be effected by any of the processes of rubbing the substrate surface with cotton swab or polishing material, carrying out oblique vapor deposition of an inorganic material on the substrate surface, rubbing organic silane coated on the substrate surface or forming a film of a certain kind of plastics material on the substrate surface. The perpendicular treatment of the substrate surface (namely, treatment for causing the molecules of the liquid crystal to be orientated perpendicular to the substrate surface) can be carried out, for example, by acid treatment of the substrate surface, treatment of the substrate surface with a surfactant as coating of organic silane on the substrate surface. (The surface of the substrate thus treated is hereinafter referred to as a "perpendicular treated plane").

A nematic liquid crystal used in the liquid crystal color display device of this invention may have a positive or negative dielectric anisotropy. Particularly preferred from the standpoint of an effective life is a field effect type nematic liquid crystal which is not doped with electrolyte. A nematic liquid crystal doped with electrolyte is not preferred, because such liquid crystal has an effect of dynamic scattering. Compounds expressed by any of the following general chemical structural formular are available as a liquid crystal having a positive dielectric anisotropy. The compounds may be used alone or in combination.

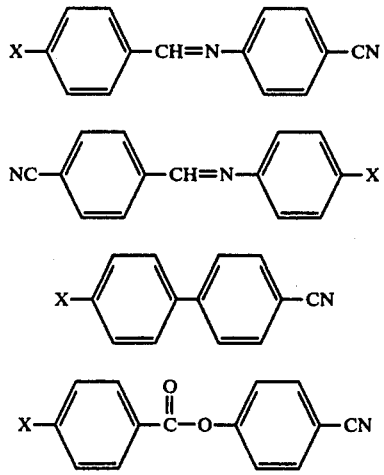

where:
X = alkyl group, alkoxy group or alkoyloxy group

Compounds expressed by the above-mentioned general chemical structural formulas include, for example, 4'-n-butoxybenzylidene-4-cyanoaniline, 4'-n-hexylbenzylidene-4-cyanoaniline, and 4'-n-pentyl-4-cyanobiphenyl.

Compounds expressed by any of the following general chemical structural formulas are adapted for use as a liquid crystal having a negative dielectric anisotropy. The compounds may be used alone or in combination.

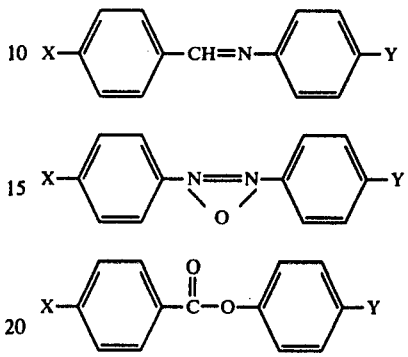

where:
X, Y = alkyl group, alkoxy group or alkoyloxy group

Compounds expressed by the above-mentioned general chemical structural formulas include, for example, 4'-methoxybenzylidene-4-n-butylaniline, 4'ethoxybenzylidene-4-n-butylaniline and 4'-methoxy-4-n-butylazoxybenzene.

The liquid crystal used in this invention includes many other compounds than listed above. These compounds may be applied alone or in combination. It is possible to use a mixture of liquid crystals having positive and negative forms of dielectric anisotropy.

As previously mentioned, a nematic liquid crystal used in the liquid crystal color display device of this invention may be of positive or negative dielectric anisotropic type. However, application of the positive dielectric anisotropic type has the advantage that when impressed with an increasing amount of voltage, this type of nematic liquid crystal has its birefringence theoretically reduced to zero, enabling a black color to be displayed, that is, increasing a number of colors being indicated.

Conversely, application of the negative dielectric anisotropic type of nematic liquid crystal has the drawback that impression of an increasing amount of voltage causes the birefringence of the liquid crystal to be elevated to twice that which occurs during absence of voltage, preventing the resultant color display device from indicating a black color and imposing a limit on a number of colors being displayed by said device.

When impressed with voltage, the positive dielectric anisotrpic type of nematic liquid crystal has the characteristic that difference of voltage levels used to display colors is wide within the voltage range where the molecules of the nematic liquid crystal are orientated approximately perpendicular to the substrate surface. When impressed with voltage, the negative dielectric anisotropic type of nematic liquid crystal is characterized in that difference of voltage levels used to display colors is wide within the voltage range where the molecules of the nematic liquid crystal are orientated approximately parallel with the substrate surface.

In the voltage range admitting of easy control of color selection by impression of voltage, a color display device using the positve dielectric anisotropic type of nematic liquid crystal displays distinct colors, whereas a color display device provided with the negative dielectric anisotropic type of nematic liquid crystal presents faint colors. Display of distinct colors by application of the negative dielectric anisotropic type of nematic liquid crystal requires said liquid crystal to have such an extremely small thickness as less than 5 microns, demanding close care in manufacturing a liquid crystal cell.

The advantages offered by the positive dielectric anisotropic type of nematic liquid crystal are listed below:

1. It is possible to display red, green and blue colors, intermediates colors and also a black color.
2. It is possible to display a large number of colors including those having prominent brightness and those having an intermediate degree of brightness.
3. Where no voltage is supplied, a faint ground color appears, whereas impression of voltage provides a distinct deep color.
4. A broad voltage range is allowed for display of a distinct color (low-order interference color), admitting of easy control of color selection.
5. A liquid crystal cell can be produced with high precision.
6. A large degree of positive dielectric anisotropy enables the resultant liquid crystal cell to be operated at a relatively low voltage.

Further, it is possible to use a liquid crystal cell formed of a mixture of a nematic liquid crystal having a positive dielectric anisotropy and that having a negative dielectric anisotropy. The reason is that the nematic liquid crystal interposed between the electrodes eventually presents a positive or negative dielectric anisotropy.

With a liquid crystal of positive dielectric anisotropy, a dielectric constant in the direction of the long axis of the molecules of said liquid crystal is larger than a dielectric constant in a direction perpendicular to that of the long axis of said molecules. Conversely, with a liquid crystal of negative dielectric anisotropy, a dielectric constant in a direction perpendicular to that of the long axis of the molecules of said liquid crystal is larger than a dielectric constant in the direction of the long axis of said molecules. In either case, the liquid crystal molecules are so orientated, upon impression of voltage, as to cause the direction in which the liquid crystal molecules present a larger dielectric constant to be parallel with the direction in which an electric field is applied.

From the stand point of the principle on which the conventional ECB system is based, the molecules of a liquid crystal should be so orientated, in the absence of voltage, as to cause the direction in which said molecules have a larger dielectric constant to intersect at right angles the direction in which an electric field is applied.

Where no voltage is impressed, therefore, it is necessary to treat that surfaces of the substrates of a liquid crystal cell using a liquid crystal of positive dielectric anisotropy which are provided with transparent electrodes so as to cause the direction of the long axis of the molecules of the liquid crystal to be parallel with said substrate surfaces, and also to treat that surfaces of the substrates of a liquid crystal cell comprising a liquid crystal of negative dielectric anisotrpy which are provided with transparent electrodes so as to cause the direction of the long axis of the molecules of the liquid crystal to be perpendicular to said substrate surfaces. Namely, it is necessary to use a liquid crystal cell whose substrates should have surfaces treated by different processes according as the liquid crystal has positive or negative dielectric anisotropy.

In contrast, the liquid crystal color display device of this invention has the advantage that a liquid crystal cell receiving a liquid crystal comprises two substrates whose surfaces are respectively subjected to the previously defined "parallel treatment" and "perpendicular treatment", admitting of the application of a liquid crystal having either positive or negative dielectric anisotropy.

Unlike the prior art ECB system, the liquid crystal color display device of this invention is characterized in that the molecules of a liquid crystal not near the substrate surfaces are initially inclined to the substrates even in the absence of voltage, making it possible to change the inclination angle of said moleculer by impression of low voltage. In other words, the color display device of this invention has so low a threshold voltage as to enable colors to be changed at low voltage. Moreover, with the subject liquid crystal color display device, a broader range of voltage is allowed for display of respective color such as red, blue and green than in the prior art ECB system. Namely, the respective colors can be selectively displayed over a wide voltage range.

The level of voltage (effective voltage) impressed on the liquid crystal cell to display various colors can also be changed by means of varying the width of voltage pulse.

Further even where the liquid crystal cell is not provided with electrodes, the liquid crystal color display device of this invention enables colors to be changed, provided said color display device comprises means for varying the inclination angle of the molecules of the liquid crystal by applying, for example, a magnetic field. Moreover, the subject liquid crystal color display device is less affected than the prior art ECB system by the precision with which the thickness of the liquid crystal cell is defined, that is, deviations in said thickness, offering prominent advantage in manufacturing the liquid crystal cell.

The foregoing description of the liquid crystal color display device of this invention refers to the transparent type of FIG. 1. However, the invention is also applicable to a reflection type. Namely, a reflection type color display device in which a light-reflecting or light-diffusing board is provided on the light-emitting side of the liquid crystal cell of FIG. 1, or another reflection type color display device in which one of the substrates constituting a liquid crystal cell is a light-reflecting board provided with an electrode can still present as excellent a color-displaying property as the aforesaid transparent type color display device. In the case of the reflection type color display device comprising a light-reflecting board, provision of a polarizer only on the opposite side of the liquid crystal cell to the light-reflecting board provides as efficient a reflection type color display device as the above-mentioned transparent type of FIG. 1.

While the liquid crystal color display device of this invention admits, as described above, of application of any type of nematic liquid crystal, provision of a nematic liquid crystal cell whose retardation value falls within a certain range has been found to enable the subject color display device to present prominent properties. Namely, it has been disclosed that a liquid crystal cell comprising a nematic liquid crystal of positive dielectric anisotropy and indicating a retardation value of 300 to 10,000 mµ in the absence of voltage and a liquid crystal cell comprising a nematic liquid crystal of negative dielectric anisotropy and showing a retardation value of 100 to 2000 mµ in the absence of voltage exhibit excellent properties.

The retardation value of a liquid crystal cell depends on the birefringence of a liquid crystal received in the cell and a distance between the two substrates of the liquid crystal cell where, therefore, the kind of liquid crystal or an intersubstrate distance is so chosen as to cause the resultant liquid crystal cell to have a retardation value falling within the above-mentioned range in the absence of voltage, then it has been found that colors being displayed can be changed at low voltage and a broad range of voltage is allowed for display of respective colors such as red, blue and green, admitting of easy control of color selection, and attaining display of various colors under a stable condition.

Conversely, where a liquid crystal cell is used which indicates a retardation value falling outside of the abovementioned range in the absence of voltage, then there results a practically undesirable liquid crystal display device which presents difficulties in displaying distinct colors and changing colors, indicates only a black color, or causes a voltage range for display of colors to be shifted to a high level side.

There will now be described by reference to FIG. 2 a liquid crystal color display device according to another embodiment of this invention. This modified liquid crystal color display device has an additional liquid crystal cell disposed to face the liquid crystal cell of FIG. 1 in the same optical path as the latter cell. Said additional liquid crystal cell similarly comprises two substrates whose surfaces are alike subjected to the previously defined "parallel treatment" respectively and a liquid crystal of positive dielectric anisotropy interposed between the two substrates. Said additional liquid crystal cell is further provided with means for causing the liquid crystal to present rotatory polarization in the absence of an electric field and to cease to display rotatory polarization upon impression of an electric field. At least one polarizer is provided in the optical path of the additional liquid crystal cell.

Figure 2:
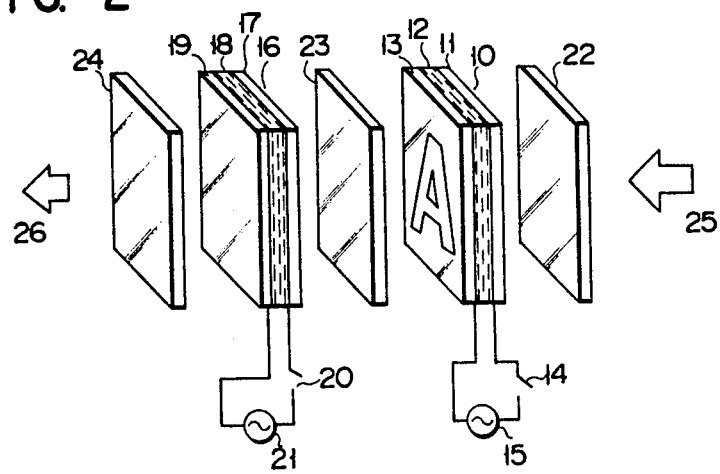
FIG. 2 is an oblique explosed view of a liquid crystal color display device according to another embodiment of the invention.

There will now be further detailed the modified liquid crystal color display device of FIG. 2 comprising the abovementioned additional liquid crystal cell. A liquid crystal cell 10 comprises two transparent substrates 11, 13 made of for example, glass, wholly or partly coated with an electrode, subjected to the previously defined "parallel treatment", and so disposed as to cause the directions of treatment to intersect each other at right angles; and a liquid crystal 12 of positive dielectric anisotropy interposed between the two substrates. The "parallel treatment" of the substrate surface is effected by rubbing with cotton swab or any other rubbing material or oblique vapor deposition of an inorganic material on said substrate surface. One of the leads drawn out of the electrodes coated on the substrates 11, 13 is directly connected to a power source 15, and the other lead is connected to said power source 15 through a switch 14. The liquid crystal cell 10 constructed as described above is, for example, a TN (twisted nematic) type which displays rotatory polarization in the absence of an electric field and ceases to display said rotatory polarization upon application of an electric field.

A liquid crystal cell 16 of the "perpendicular-parallel treatment" type is so disposed as to face the first mentioned TN type liquid crystal cell 10 in the same optical path as the latter cell. The liquid crystal cell 16 comprises a substrate 17 subjected to the "parallel treatment" and a substrate 19 subjected to the "perpendicular treatment", both substrates 17, 19 being so arranged as to cause the treated surface to face each other; and a nematic liquid crystal 18 interposed between said substrates 17, 19. The carried out by acid treatment or treatment with any kind of surfactant. The substrates 17, 19 are each coated with an electrode. One of the leads extending from the substrates 17, 19 is directly connected to a power source 21, and the other lead is connected to said power source 21 through a switch 20. Thus is formed the liquid crystal cell 16, in which the molecules of the liquid crystal are orientated perpendicular to and parallel with the substrate surface.

The TN type liquid crystal cell 10 and liquid crystal cell 16 of the "perpendicular-parallel treatment" type are arranged in the same optical path so as to face each other. Polarizers 22, 23, 24 are so located as to cause both liquid crystal cells 10, 16 to be placed in the interspaces defined between the two adjacent ones of said these polarizers 22, 23, 24, as illustrated in FIG. 2.

With the modified liquid crystal display device of FIG. 2, an incident light 25 passages through the polarizer 22 to be converted into a linerarly polarized light. That portion of the TN liquid crystal cell 10 which is impressed with an electric field ceases to display rotatory polarization due to the molecules of the liquid crystal being orientated perpendicular to the substrate surface, whereas that portion of the TN liquid crystal cell 10 which is not supplied with an electric field displays rotatory polarization. The polarizers 22, 23 are so are so arranged as to cause the directions of their polarization axes to intersect each other at right angles or be disposed parallel with each other and also to cause the direction of the polarization axis of one of said polarizers to be aligned with the direction of the "parallel treatment" of the substrate included in the TN liquid crystal cell. Thereby the polarizers 22, 23 and TN liquid crystal cell 10 jointly act as a light shutter.

Where the directions of the polarization axes of the polarizers 22, 23 intersect each other at right angles, an incident light 25 converted into a linearly polarized light after passing through the polarizer 22 travels through the electric field-free section of the liquid crystal cell 10 and does not run through the electric field-impressed section of said cell 10. Conversely, where the directions of the polarization axes of the polarizers 22, 23 are disposed parallel with each other, the incident light 25 does not penetrate the electric field-free section of the liquid crystal cell 10, but is carried through the electric fieldimpressed section of said cell 10. A lineraly polarized light selectively passing through the polarizers 22, 23 and TZN liquid crystal cell 10 is sent through the liquid crystal cell 16 subjected to the "perpendicular-parallel treatment" to form an elliptically polarized light. A light 26 which has selectively run through the polarizer 24 displays a color by an interference phenomenon.

Therefore, the modified liquid crystal color display device of FIG. 2 has such excellent color-displaying characteristic little expected from any of the prior art color display devices that various colors appear on the backgroun of a black color or a black color is indicated on the background of any other color. Moreover, the modified liquid crystal color display device of FIG. 2 has the advantage of carrying out color display at low voltage, displaying bright distinct colors in good contact and easily controlling color selection by change of voltage.

With the modified liquid crystal color display device of FIG. 2, the TN liquid crystal cell 10 is positioned on the light-receiving side of said device. However, the liquid crystal cell 16 of the "perpendicular-parallel treatment" type may be located on the light-receiving side. The point is that both liquid crystal cells 10, 16 should be disposed on the same optical path. With the liquid crystal cell of the "perpendicular-parallel treatment" type, it is possible to locate the substrate surface subjected to "perpendicular treatment" on the light-receiving side and dispose the substrate surface subjected to "parallel treatment" on the light-emitting side.

While the modified liquid crystal color display device of FIG. 2 is a light-transmitting type, a light-reflecting type presents the same excellent property which has a light-diffusing or light-reflecting board provided on the light-emitting side.

With the modified liquid crystal color display device of FIG. 2, any liquid crystal may be used for the TN liquid crystal cell 10, provided said liquid crystal has positive dielectric anisotropy.

The liquid crystal cell 16 of the "perpendicular-parallel treatment" type should consist of a nematic liquid crystal, regardless of whether it has positive or negative dielectric anisotropy.

Therewill now be described by reference to FIG. 3 a liquid crystal color display device according to still another embodiment of this invention, which comprises at least two mutually facing liquid crystal cells subjected to the "perpendicular-parallel treatment" and polarizers respectively provided in the optical path of each liquid crystal cell.

Figure 3:
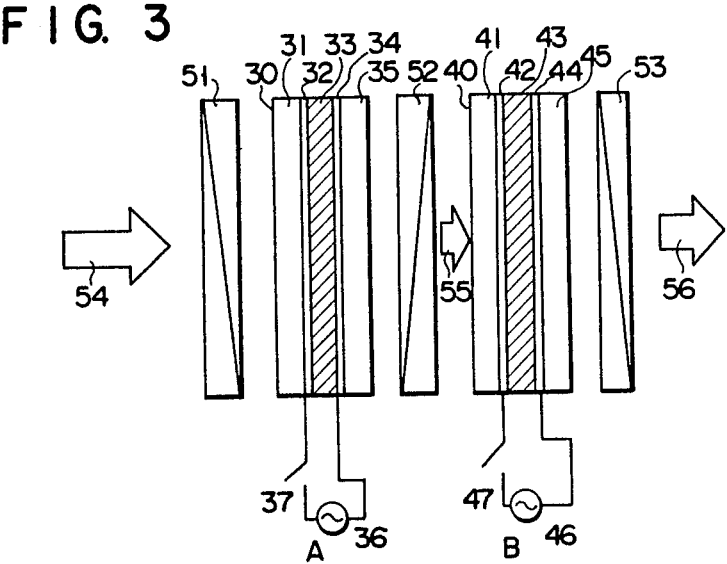
FIG. 3 is a cross sectional view of a liquid crystal color display device according to still another embodiment of the invention.

The embodiment of FIG. 3 has at least two liquid crystal cells 30, 40 subjected to the "perpendicular-parallel treatment" like that of FIG. 1 and arranged in the same optical path. Three polarizers 51, 52, 53 are also provided on said optical path, such that for example, two liquid crystal cells 30, 40 are located between every two adjacent ones of said three polarizers 51, 52, 53. The embodiment of FIG. 3 further comprises means for changing the birefringence of the liquid crystals constituting the liquid crystal cells 30, 40 independently of each other. One of the leads drawn out of two transparent electrodes 32, 34 mounted on two transparent substrates 31, 35 is directly connected to a power source 36 and the other lead is connected to said power source 36 through a switch 37. Similarly, one of the leads extending from two transparent electrodes 43, 44 mounted on two transparent substrates 41, 45 is directly connected to a power source 46 and the other lead is connected to said power source 46 through a switch 47. The liquid crystals 33, 43 are of the nematic type.

With the liquid crystal color display device of FIG. 3, an incident light 54, for example, a white light passes through the polarizer 51 to be converted into a linearly polarized light, and runs through the first liquid crystal cell 30 to be changed into an eliptically polarized light, and further travels through the polarizer 52 to present a color due to a transmitted light being selected by an interference phenomenon. A light running through the polarizer 52 is conducted through the second liquid crystal cell 40 and the polarizer 53 to be changed into an emitted light 56 having a spectral characteristic different from those of the first and second liquid crystal cells 30, 40. With either of the first and second liquid crystal cells 30, 40, the spectral characteristic of the transmitted light 56 can be freely changed by application of an electric field with the corresponding switch 37 and/or 47 thrown in, namely, the wavelength of the transmitted light 56 can be freely selected, thereby enabling different colors to be successively displayed. The liquid crystal color display device of FIG. 3 in which the first and second liquid crystal cells 30, 40, polarizers 51, 52, 53 are arranged in the same optical path admits more sensitive selection of the wavelength of an incident light than a liquid crystal color display device consisting of only one liquid crystal cell and polarizers, and decreases the width of the spectral bands of a transmitted light, minimizing the possibility of the wavelength of said light being mixed with that of another light showing a different color, thereby attaining the display of very pure distinct colors.

With the liquid crystal color display device of FIG. 3, the direction of the polarization axis of the polarizer 51 is chosen to define a certain angle with the direction of the "parallel treatment" applied to the surface of the substrate 31. The directions of the polarization axes of the polarizers 52, 53 are optionally determined.

It is possible to apply the "perpendicular treatment" to the surface of the substrate 31 and the "parallel treatment" to the surface of the substrate 35. Most distinct colors are displayed, when the under mentioned conditions are all satisfied, that is, where the polarization axis of the polarizer 51 defines an angle of 45° with the direction of the "parallel treatment" applied to the first liquid crystal cell 30; the direction of the polarization axis of the polarizer 52 intersects that of the polarizer 51 at right angles or lies parallel therewith; the direction of the "parallel treatment" applied to the second liquid crystal cell 40 defines an angle of 45° with the direction of the polarization axis of the polarizer 52; and the direction of the polarization axis of the polarizer 53 intersects that of the polarizer 52 at right angles or lies parallel therewith.

The embodiment of FIG. 3 comprising at least two liquid crystal cells and a plurality of polarizers is operated at low voltage, allows a broader voltage range for display of colors with the resultant ease of controlling color selection, and displays colors such as blue, green, red, yellow and black more distinctly.

With the embodiment of FIG. 3, both liquid crystal cells 30, 40 were provided with means for applying an electric field. However, it is possible to provided said means only for one of said liquid crystal cells 30, 40. Further, magnetic field-applying means may be used in place of the electric field-applying means. In the case of a magnetic field, it is possible to omit the transparent electrodes mounted on the liquid crystal cells 30, 40.

It is also possible to use a reflection type color display device in which a light-reflecting or light-diffusing board is provided on the side of emitted light 56 or in which the substrate 45 of the second liquid crystal cell 40 is a light-reflecting board provide with an electrode.

The liquid crystal color display device of this invention will be more fully understood by reference to the following examples and controls.

EXAMPLE 1

Two glass substrates were each coated with a transparent electrode. That surface of one of said two glass substrates which was coated with a transparent electrode was rubbed with cotton swab in a prescribed direction, namely, for the previously defined "parallel treatment". That surface of the other glass substrate which was coated with a transparent electrode was subjected to the "perpendicular treatment" by applying organic silane. The two substrates were so arranged as to cause their treated surfaces to face each other. A spacer was interposed between the substrates to provide a space of 8 microns between the electrodes. A mixture of two nematic liquid crystals, 4'-methoxybenzylidene-4-n-butylaniline (hereinafter abbreviated as "MBBA") and 4'-n-butoxybenzylidene-4-cyanoaniline (hereinafter abbreviated as "BBCA"), was poured into an interspace between the two substrates to provide a liquid crystal cell. The liquid crystals MBBA and BBCA were mixed in the ratio of 4 weight parts to 1 weight part. The liquid crystal mixture had positive dielectric anisotropy and a nematic temperature ranging from 8° to 57° C.

The optical measurements of said liquid crystal cell were done by means of a polarization microscope (manufactured by NIHON KOGAKU CO.), selectively using one of three filters respectively allowing the passage of a red light (R) having a dominant wavelength of 632.7 nm, a green light (G) having a dominant wavelength of 554.6 nm and a blue light (B) having a dominent wavelength of 452.0 nm. An amount of light passing through said liquid crystal cell with any of the three filters was detected by a photomultiplier posialong above the passage of an incident white light.

Sine wave alternating current of 500 Hz was used as a power source. Interelectrode voltage was changed, starting with zero volt for variation of the birefringence of the liquid crystal.

Figure 4:
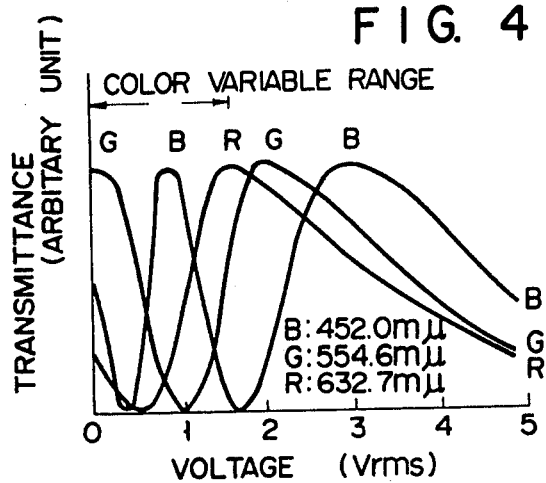
FIGS. 4, 5 and 7 present color transmission curves obtained from the liquid crystal color display device of FIG. 1.

The polarizers and liquid crystal cells were so arranged as to cause the directions of the polarization axes of two polarizers included in the polarization microscope to intersect each other at right angles and also to cause the direction of the polarization axis of one of the two polarizers to define an angle of 45° with the direction in which the substrate surface was rubbed. FIG. 4 presents the light transmission through said liquid crystal cell with any of the three light filters, where varying levels of voltage were impressed.

Naked eye observation was made of changes of colors corresponding to those of voltage levels applied. In Example 1, a color appearing in the absence of an electric field was yellowish green. Table 1 given later indicates the relationship of colors and levels of voltage impressed. FIG. 4 sets forth the range within which voltage can be varied for display of respective distinct colors i.e. color variable voltage range. The curves given in FIG. 4 denote the voltage range adapted to display most distinct red, blue and green lights when naked eye observation was made of changes in colors resulting from those of voltage levels applied. Experiments of Example 1 show that allowable changes in the levels of voltage applied ranged between zero volt and 1.5 volts (rms). Further as apparent from Table 1 given below. Voltage levels required for display of green, blue and red respectively indicated a difference of 0.3 V (rms). Thus it is seen that the liquid crystal color display device of this invention admits easy control of color selection, an excellent property little expected from any prior art similar color display device.

Furthermore, said liquid crystal color display device of this invention indicated such an excellent property also by varying the width of voltage pulse impressed on the liquid crystal cell.

Control 1

Two glass substrates were each coated with a transparent electrode. That surface of each substrate which was coated with the transparent electrode was rubbed with cotton swab in a prescribed direction. The substrates were so arranged as to cause the directions of rubbing to be aligned and also to cause the electrode-coated surfaces to face each other. The interelectrode space was chosen to be 8 microns by insertion of a spacer. The same mixture of liquid crystals as used in Example 1 was poured into an interspace between the substrates, providing a liquid crystal cell following the ECB system. Measurements were made in the same manner as in Example 1. Table 1 below shows the relationship of colors observed by the naked eye and levels of voltage required to display said colors. It is seen from Table 1, that with the ECB type liquid crystal color display device, levels of voltage approximating 2 volts (rms) were applied to display green, blue and red lights, and that the color variable voltage range between 1.8 volts (rms) and 2.2 volts (rms), namely, had a narrow extent of 0.4 volt (rms) as inferred from Table 1 below. With Control 1, voltage levels for display respective colors had such a small difference as 0.1 V (rms).

The above-mentioned experimental results disclose that as compared with the liquid crystal color display device of this invention described in Example 1, the conventional liquid crystal color display device of the ECB system required application of 2- to 3-fold higher voltage for display of green, blue and red lights, and the voltage levels had as small a difference as one-third of that which occurs in the voltage levels applied in the color display device of this invention, presenting considerable difficulties in controlling color selection.

Table 1

| Liquid crystal | | Example 1 | Control 1 |
|---|---|---|---|
| | | Mixture of 4 weight parts of MBBA and 1 weight part of BBCA | Mixtue of 4 weight parts of MBBA and 1 weight part of BBCA |
| Interelectrode space (microns) | | 8 | 8 |
| Voltage levels required to display various colors (V rms) | Green | 0.6 | 1.9 |
| | Blue | 0.9 | 2.0 |
| | Red | 1.2 | 2.1 |

EXAMPLE 2

Figure 5:
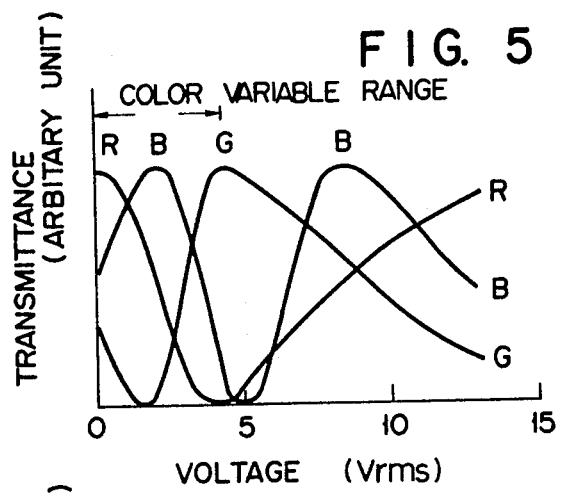

Substantialy the same type of liquid crystal cell as in Example 1 was formed, excepting that a liquid crystal of negative dielectric anisotropy was used and an interelectrode space was chosen to be 5 microns. Measurements were made in the same manner as in Example 1. 3 parts by weight of MBBA and 2 parts by weight of 4'-ethoxybenzylidene-4-n-butylaNiline (hereinafter abbreviated as "EBBA") were mixed to form a liquid crystal, which had negative dielectric anisotropy and a nematic temperature ranging between 6° and 53° C. The results of measuring the intensity of a transmitted light are presented in FIG. 5, and the relationship of the colors and voltage levels impressed is set forth in Table 2 below. In Example 2, the subject color display device showed a red color when not impressed with voltage. As apparent from FIG. 5, the color variable voltage range was so broad as to extend from zero volt to 4 volts (rms). Yet, the voltage levels required to display respective colors were very low and had as wide a difference as about 1 volt (rms). As described above, the liquid crystal color display device of this invention, even if formed of a nematic liquid crystal of negative dielectric anisotropy, is shown to present such excellent properties that the device can be operated at low voltage and control color selection over a fully broad range of voltage.

Control 2

Figure 6:
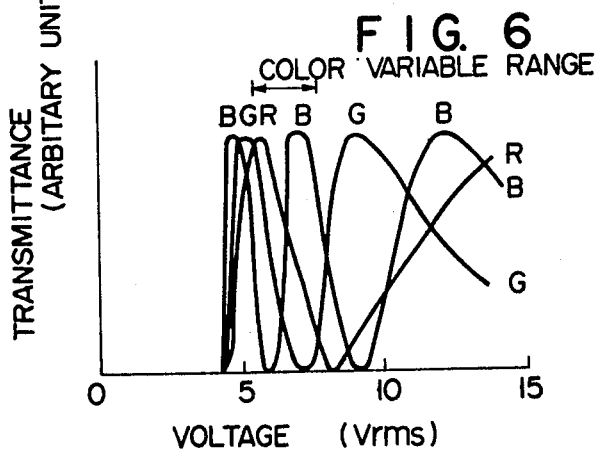
FIG. 6 sets forth color transmission curves derived from the prior art liquid crystal color display device.

Two glass substrates were each coated with a transparent electrode on one side. That surface of each substrate which was provided with the transparent electrode was further coated with organic silane to cause the liquid crystal molecules to be orientated perpendicular to the substrate surface. A liquid crystal cell was prepared from the same kind of liquid crystal as used in Example 2 with an interelectrode distance chosen to be 5 microns. Measurements were made in the same manner as in Example 1. FIG. 6 shows the intensity of a transmitted light, and Table 2 below sets forth the relationship of colors and voltage levels impressed. Control 2 represents a different liquid crystal color display device of the ECB system from that of Control 1.

FIG. 6 and Table 2 show that with the color display device of Control 2, the color variable voltage range was as narrow as 5.5 to 7.4 volts (rms), but voltage levels required for display of colors were extremely higher as 2 to 10 fold than in Example 2, and the voltage levels used to display colors indicated as small a difference as 0.4 to 0.5 volt (rms), a value equal to about one half of that which occurred in Example 2, thus presenting great difficulties in controlling color selection.

Table 2

| Liquid crystal | | Example 2 | Control 2 |
| --- | --- | --- | --- |
| | | 3 weight parts of MBBA and 2 weight parts of EBBA | 3 weight parts of MBBA 2 weight parts of EBBA |
| Interelectrode space (microns) | | 5 | 5 |
| Voltage levels required to display colors (V rms) | Red | 0.6 | 6.0 |
| | Blue | 2.0 | 6.4 |
| | Green | 3.1 | 6.9 |

EXAMPLE 3

Figure 7:
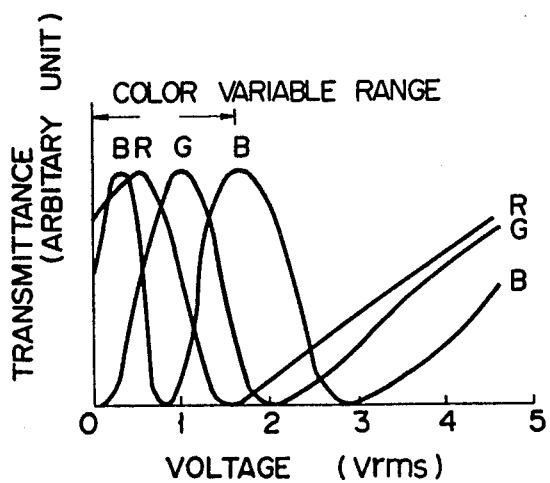

A liquid crystal cell and a plurality of polarizers were so arranged as to cause the directions of the polarization axes of two polarizers used with a polarization microscope to be disposed parallel with each other, and also to cause the direction in which the surface of one substrate of a liquid crystal cell was rubbed to define an angle of 45° with the direction of the polarization axis of one of the two polarizers. The liquid crystal cell used was of the same kind as that of Example 1. Measurements were made in the same manner as in Example 1. FIG. 7 shows the results of measuring the intensity of a transmitted light and Table 3 below sets forth the relationship of colors and voltage levels impressed. The liquid crystal color display device of Example 3 displayed color complementary to those appearing in Example 1. With the liquid crystal color display device of Example 3, as in Example 1, the color variable voltage range was so broad as to extend from zero volt to 1.5 volts (rms), enabling the color display device to be operated at low voltage, and the voltage levels required for displaying respective colors indicated as large a difference as 0.3 volt (rms). Therefore, the liquid crystal color display device of Example 3 also presented excellent properties.

Table 3

| Liquid crystal | | Example 3 |
| --- | --- | --- |
| | | 4 weight parts of MBBA 1 weight part of BBCA |
| Interelectrode space (microns) | | 8 |
| Voltage levels required to display colors (V rms) | Red | 0.6 |
| | Yellow | 0.9 |
| | Green | 1.2 |

There will now be described the examples in which the retardation value of a liquid crystal cell used with the color display device of this invention was chosen to fall within a prescribed range in the absence of an electric field.

EXAMPLE 4

Substantially the same kind of liquid crystal cell as in Example 1 was prepared, excepting that an interelectrode space was chosen to have the undermentioned range of value.

The retardation value of a liquid crystal cell used was chosen to fall within the range of 300 to 10,000 m$\mu$ in the absence of an electric field with an interelectrode space varied. The interelectrode space corresponding to said range of retardation lay between 2.5 and 83 $\mu$m. With a liquid crystal color display device using a liquid crystal cell whose retardation value full within the above-mentioned range, colors were changed at low voltage, and the voltage levels required for display of respective colors had a wide difference, attaining easy control of color selection and display of stable colors.

Where a liquid crystal cell had a larger retardation value than 900 m$\mu$ in the absence of an electric field with an interelectrode space chosen to be broader than 7.5 microns, then said liquid crystal cell displayed distinct green, blue and red lights when impressed with an electric field. Further, a liquid crystal cell whose retardation value was set at 700 m$\mu$ with an interelectrode space chosen to be 5.9 microns indicated a distinct blue light in the absence of an electric field and a distinct red light when impressed with a voltage of 0.5 volt (rms).

On the other hand, a liquid crystal cell whose retardation value was chosen to be 250 m$\mu$ in the absence of an electric field with an interelectrode space set at 2.1 microns displayed a very dark grey light while not being impressed with an electric field. Even impression of high voltage only resulted in slightly increased darkness, failing to produce such excellent proparties as are exhibited by a liquid crystal cell whose retardation value is chosen to range between 300 and 10,000 m$\mu$ in the absence of an electric field.

Further, where a liquid crystal cell had a larger retardation value than 11,000 in the absence of the electric field with an interelectrode space chosen to be 92 microns, then as high voltage as 10 to 12 volts (rms) was required for display of distinct green, blue and red lights. Moreover, these lights indicated low degrees of transparency and distinctiveness, and an undesirably long response time was consumed in displaying said colors. Therefore, the abovementioned liquid crystal cell failed to present such excellent properties as are indicated by a liquid crystal cell whose retardation value is chosen to lie between 300 and 10,000 m$\mu$ in the absence of an electric field.

As mentioned above, a liquid crystal cell whose retardation value was chosen to range between 300 and 10,000 mμ in the absence of an electric field and which was formed of a liquid crystal of positive dielectric anisotropy provided a liquid crystal display device having such excellent properties as enabling colors to be changed at low voltage and causing voltage levels required for display of respective colors to have a wide difference, thereby attaining easy control of color selection and display of stable color.

In Example 4, control of retardation value was effected by changing an interelectrode space. However, said control can also be carried out by applying another liquid crystal of positive dielectric anisotropy having different degrees of birefringence, with an interelectrode space unchanged.

EXAMPLE 5

A liquid crystal cell was prepared in substantially the same manner as in Example 4 excepting that the interelectrode space was changed as described below and the liquid crystal used MBBA having negative dielectric anisotropy. The retardation value of the liquid crystal cell was chosen to lie between 100 to 2,000 mμ in the absence of an electric field with an interelectrode space ranged between 0.9 and 17 microns so as to correspond to the above-mentioned range of retardation. With a liquid crystal color display device using a liquid crystal cell whose retardation value was chosen to fall within the above-mentioned range, colors were changed at low voltage, and voltage levels required for display of respective colors had a wide difference, attaining easy control of color selection and display of stable colors.

Particularly where a liquid crystal cell has a retardation value of 400 to 500 mμ in the absence of an electric field with an interelectrode space chosen to lie between 3.4 and 4.2 microns, then distinct red, blueand green lights were displayed when an electric field was applied to said liquid crystal cell.

On the other hand, where a liquid crystal cell had a retardation value of 60 mμ in the absence of an electric field with an interelectrode space set at 0.5 micron, then a black color was indicated while said liquid crystal was not impressed with an electric field. Even application of high voltage only displayed said black color with slightly increased brightness, thus preventing the liquid crystal cell of the 60 mμ retardation from displaying such excellent properties as obtained from a liquid crystal cell whose retardation value ranged between 100 and 2000 mμ in the absence of an electric field.

Where a liquid crystal cell had a retardation value of 3,000 mμ in the absence of an electric field with an interelectrode space chosen to be 25 microns, then no distinct color was indicated, whether or not said liquid crystal cell was impressed with an electric field.

As apparent from the foregoing description, a liquid crystal color display device using a liquid crystal cell having a retardation value ranging between 100 and 2,000 mμ in the absence of an electric field and comprising a liquid crystal of negative dielectric anisotropy had such excellent properties as enabling colors to be changed at low voltage, and allowing voltage levels required for display of respective colors to have a sufficiently broad difference from each other for easy control of color selection and displaying stable colors.

In this Example 5, the retardation value of a liquid crystal cell was controlled by varying an interelectrode space. However, said control can be effected by providing another liquid crystal cell of negative dielectric anisotropy varying different degrees of birefringence with an interelectrode space unchanged.

There will now be described examples of a further modification of the liquid crystal color display device of this invention which comprises a second liquid crystal cell designed to display rotatory polarization in the absence of an electric field and cease to display said rotatory polarization upon application of an electric field.

EXAMPLE 6

A second TN liquid crystal cell was disposed to face the liquid crystal cell of Example 1 used as a first liquid crystal cell in the same optical path as the latter cell. The second TN liquid crystal cell comprised two glass substrates each coated with a transparent electrode on one side. That surfaces of substrates which were coated with the transparent electrodes were rubbed with a cotton swab in a prescribed direction so as to cause the molecules of the liquid crystal to be orientated parallel with the substrate surfaces. The treated surfaces of the two substrates were made to face each other so as to cause the directions of said "parallel treatment" to intersect each other at right angles. An interelectrode space was chosen to be 10 microns by insertion of a spacer. The same kind of liquid crystal as used in Example 1 was poured into an interspace between the two substrates of the TN liquid crystal cell. A plurality of polarizers 22, 23 were provided in the optical path of the second TN liquid crystal cell, such that, as shown in FIG. 2, the directions of the polarization axes of the polarizers 22, 23 were arranged parallel with each other and the directions of said polarization axes were aligned with the direction in which the surface of one of the two substrates of the second TN liquid crystal cell was rubbed. Disposed on the optical path of the first liquid crystal cell whose two substrates were subjected to the "perpendicular treatment" and "parallel treatment" respectively were polarizers 23, 24, such that the directions of the polarization axes of said polarizers 23, 24 intersect each other at right angles and the direction of the polarization axis of one of said two polarizers 23, 24 defined an angle of 45° with the directions in which the surface of one of the two substrates of said first crystal cell were subjected to "parallel treatment" respectively. The surface of one of the two substrates of the TN liquid crystal was coated with a transparent electrode to display a character "A".

Where the first and second crystal cells were not impressed with voltage, the modified color display device of this Example 6 displayed a black color. When the second liquid crystal cell was impressed with a voltage of 1.5 volts (rms), the character "A" appeared in a yellowish green color. The other sections of the display surface of said one substrate than the character "A" remained black. The character "A" was displayed in green when the first liquid crustal cell was impressed with 0.6 volt; in blue when 0.9 volt (rms) was impressed on said liquid crystal cell; in red when 1.2 volts (rms) were applied; and in yellow when 1.7 volts (rms) were impressed. In all these cases, the other sections of the display surface of said one substrate than the character "A" remained black.

As described above, the modified liquid crystal color display device of Example 6 displayed distinct green, blue, red and, yellow lights on the black background. Since the background was indicated in black, the color display device of Example 6 displayed colors in far more improved contrast than in a color display device using a single liquid crystal cell whose two substrates were subjected to the "perpendicular treatment" and "parallel treatment" respectively. Further, the modification of Example 6 indicated as excellent properties as enabling colors to be changed at low voltage and attaining easy control of color selection.

There will now be described a further modification of the liquid crystal color display device of this invention comprising a plurality of liquid crystal cells in each of which the surfaces of the two substrates were subjected to the "perpendicular treatment" and "parallel treatment" respectively.

EXAMPLE 7

Two liquid crystal cells (named "A cell" and "B cell" respectively) of substantially the same type as used in Example 1 were provided, excepting that the interelectrode spaces of said cells were chosen to be 8 microns and 14 microns respectively. The A and B liquid crystal cells were made to face each other so as to cause the directions, in which the surfaces of the substrates of both cells were rubbed, to be parallel with each other. As shown in FIG. 3, three polarizers were provided, such that each polarizer was located on the light-receiving side, light-emitting side and between the A and B cells respectively. In this case, the directions of the polarization axes of the polarizers provided on the light-receiving and light-emitting sides were arranged parallel with each other, and said directions were made to define an angle of 45° with the direction in which the surfaces of the substrates of the respective liquid crystal cells were rubbed. Further, the directions of the polarization axes of the two polarizers were used to define an angle of 90° with the direction of the polarization axis of the polarizer interposed between the A and B cells.

Spectorphotometric measurement was made of those changes in the spectrum of a transmitted light which corresponded to various degrees of the intensity of said light. By way of comparison, spectrophotometric measurement was made of those changes in the spectrum of a light transmitted through the A cell alone which corresponded to the various degrees of the intensity of said light. Similar measurement was made of those changes in the spectrum of a light transmitted through the B cell along which corresponded to various degrees of the intensity of said light. In each of said spectrophotometric measurements, two polarizers were arranged in the optical path of the A or B cell, such that the directions of the polarization axes of the two polarizers intersected each other at right angles and said directions defined an angle of 45° with the direction in which the surfaces of the two substrates of the A or B cell were rubbed.

Figure 8:
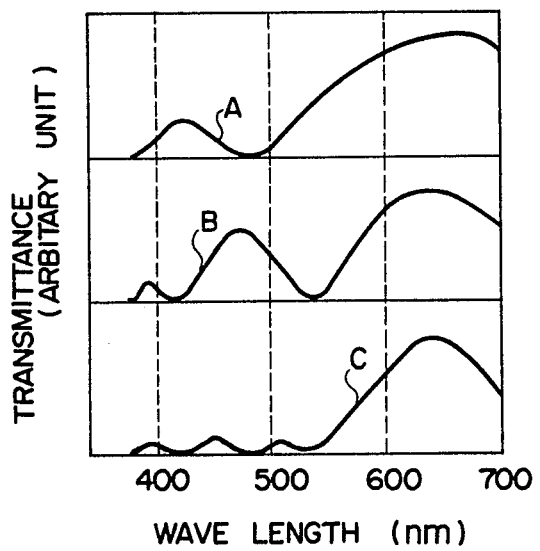
FIG. 8 shows spectral transmission curves determined from the liquid crystal color display device of FIG. 3.

The curve diagram of FIG. 8 shows those changes in the spectrum of a light transmitted through the A and B cells respectively which corresponded to the various degrees of the intensity of said light, when the A cell was impressed with 1.4 volts (rms) and the B cell with 0.9 volt (rms). Curve A of FIG. 8 denotes the results of measurement made with the A cell alone, curve B shows the results of measurement made with the B cell alone, and curve C indicates the overall results of measurement made with both A and B cells when jointly operated.

As apparent from curve C of FIG. 8, the liquid crystal color display device of Example 7 presented a peak of light transmission over the range of wave lengths lying between 600 nm and 700 nm, displaying a distinct red light. The embodiment of Example 7 substancially eliminated overlapping between the above-mentioned peak light transmittion over the wave length range of 600 to 700 nm and a peak light transmission over the wave length range of 400 to 500 nm observed in the A or B cell alone.

Where the A cell of the liquid crystal color display device of Example 7 was impressed with 4.0 volts (rms) and the B cell thereof with 4.5 volts (rms), then a black color was displayed.

With the above-mentioned modified liquid crystal color display comprising a plurality of liquid crystal cells each having the surfaces of the substrates subjected to the "perpendicular treatment" and "parallel treatment" respectively, the wave length of a transmitted light representing each color had a narrow range, reducing the possibility of said wave length range overlapping with tha of a light of any other color, thereby enabling the respective colors to be distinctly displayed.

What we claim is:

1. A liquid crystal color display device which comprises at least one liquid crystal cell formed of first and second substrates, at least one of which is transparent and both of which are coated with first and second electrodes, at least one of which is transparent and an nematic liquid crystal interposed between the first and second substrates, the surface of the first substrate being so treated as to cause the molecules of the nematic liquid crystal to be orientated parallel with the substrate surface and the surface of the second substrate being so treated as to cause the molecules of the nematic liquid crystal to be orientated perpendicular to the substrate surface; at least one polarizer; and means for varying the birefringence of the nematic liquid crystal.

2. The liquid crystal color display device according to claim 1, wherein variation of the birefringence of the nematic liquid crystal is effected by means for changing the level of effective voltage impressed across the first and second electrodes.

3. The liquid crystal color display device according to claim 1, wherein the nematic liquid crystal has positive dielectric anisotropy.

4. The liquid crystal color display device according to claim 3, wherein the liquid crystal cell has a retardation value ranging between 300 and 10,000 m$\mu$ in the absence of an electric field.

5. The liquid crystal color display device according to claim 4, wherein the liquid crystal cell has a retardation value ranging from 900 to 10,000 m$\mu$ in the absence of an electric field.

6. The liquid crystal color display device according to claim 1, wherein the nematic liquid crystal has negative dielectric anistropy.

7. The liquid crystal color display device according to claim 6, wherein the liquid crystal cell has a retardation value ranging from 100 to 2,000 m$\mu$ in the absence of an electric field.

8. The liquid crystal color display device according to claim 7, wherein the liquid crystal cell has a retardation value ranging between 400 and 500 m$\mu$.

9. The liquid crystal color display device according to claim 1, wherein the nematic liquid crystal is a field effect type free of electrolyte.

10. The liquid crystal color display device according to claim 1, which is a transparent type color display device in which the first and seccnd electrodes, and first and second substrates are all transparent; and a polarizer is provided on both light-receiving and light-emitting sides of the optical path of the liquid crystal cell respectively.

11. The liquid crystal color display device according to claim 10, wherein the directions of the polarization axes of the two polarizers intersect ech other at right angles; and the direction of the polarization axis of one of said polarizers defines an angle of 45° with the direction in which the surface of the first substrate is to treated as to cause the molecules of the nematic liquid crystal to be orientated parallel with the substrate surface.

12. The liquid crystal color display device according to claim 10, wherein the directions of the polarization axes of the two polarizers are arranged parallel with each other; and the direction of the polarization axis of one of said plarizers defines an angle of 45° with the direction in which the surface of the first substrate is so treated as to cause the molecules of the nematic liquid crystal to be orientated parallel with the substrate surface.

13. The liquid crystal color display device according to claim 1, which is a reflection type color display device in which one polarizer is disposed only on the light-receiving side of the optical path of the liquid crystal cell; and a light-reflecting plane is provided on the light-emitting side of said optical path.

14. The liquid crystal color display device according to claim 1, which is a reflection type color display device in which one polarizer is disposed only on the light-receiving side of the optical path of the liquid crystal cell; and the substrate positioned on the light-emitting side has a light-reflecting plane.

15. The liquid crystal color display device according to claim 1, wherein an additional liquid crystal cell is provided which comprises two mutually facing substrates each coated with an electrode and positioned in the same optical path of the liquid crystal cell; a liquid crystal of positive dielectric anisotropy interposed between the two substrates; and means for causing the liquid crystal to prevent rotatory polarization in the absence of an electric field and cease to display said rotatory polarization upon impression of an electric field.

16. The liquid crystal color display device according to claim 1, which comprises two liquid crystal cells and means for changing the birefrigence of the nematic liquid crystals of the respective liquid crystal cells independently of each other.

* * * * *